: US 9,500,263 B2
(45) Date of Patent: Nov. 22, 2016

(12) United States Patent
Ogauchi et al.

(54) AUTOMATIC TRANSMISSION

(71) Applicant: Mazda Motor Corporation, Aki-gun, Hiroshima (JP)

(72) Inventors: Yasuhiro Ogauchi, Higashihiroshima (JP); Shinya Kamada, Kure (JP); Tatsuhiko Iwasaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/880,835

(22) Filed: Oct. 12, 2015

(65) Prior Publication Data

US 2016/0108997 A1   Apr. 21, 2016

(30) Foreign Application Priority Data

Oct. 17, 2014 (JP) ................. 2014-213055
Oct. 17, 2014 (JP) ................. 2014-213057

(51) Int. Cl.
*F16H 3/62* (2006.01)
*F16H 3/66* (2006.01)
*F16H 3/44* (2006.01)

(52) U.S. Cl.
CPC ............. *F16H 3/666* (2013.01); *F16H 3/66* (2013.01); *F16H 2003/442* (2013.01); *F16H 2200/006* (2013.01); *F16H 2200/2012* (2013.01); *F16H 2200/2043* (2013.01)

(58) Field of Classification Search
CPC ........... F16H 3/666; F16H 2200/2043; F16H 2200/006; F16H 2200/2012
See application file for complete search history.

(56) References Cited

U.S. PATENT DOCUMENTS

| 7,699,741 | B2 | 4/2010 | Hart et al. | |
| 8,357,069 | B2* | 1/2013 | Diemer | F16H 3/66 475/289 |
| 8,556,765 | B2* | 10/2013 | Bockenstette | F16H 3/66 475/275 |
| 9,028,359 | B2* | 5/2015 | Bockenstette | F16H 3/62 475/119 |
| 2006/0270516 | A1* | 11/2006 | Klemen | F16H 3/66 475/280 |
| 2008/0009384 | A1* | 1/2008 | Diosi | F16H 3/66 475/282 |
| 2008/0064556 | A1* | 3/2008 | Kamm | F16H 3/666 475/276 |
| 2008/0171627 | A1* | 7/2008 | Wittkopp | F16H 3/666 475/276 |
| 2008/0300093 | A1* | 12/2008 | Borgerson | F16H 3/66 475/276 |

FOREIGN PATENT DOCUMENTS

JP   2008180365 A   8/2008

* cited by examiner

*Primary Examiner* — David J Hlavka
(74) *Attorney, Agent, or Firm* — Alleman Hall McCoy Russell & Tuttle LLP

(57) ABSTRACT

To simplify the hydraulic pressure supply passage to each clutch, an multistage automatic transmission comprises an input part and output part, three clutches, two brakes, and four planetary gear sets, where the first and fourth sets are of a single pinion type and the second and third of a double pinion type. The input and output parts and the planetary gear sets connect to each other and the clutches and brakes decouple components in such a way that enlargement as a whole of the transmission and the deterioration of the responsiveness of the shift control are controlled.

10 Claims, 6 Drawing Sheets

|  | CL1 | CL2 | CL3 | BR1 | BR2 |
|---|---|---|---|---|---|
| 1st Speed |  |  | O | O | O |
| 2nd Speed |  | O |  | O | O |
| 3rd Speed |  | O | O |  | O |
| 4th Speed | O | O |  |  | O |
| 5th Speed | O |  | O |  | O |
| 6th Speed | O | O | O |  |  |
| 7th Speed | O |  | O | O |  |
| 8th Speed | O | O |  | O |  |
| Reverse Speed | O |  |  | O | O |

FIG. 2

|  | Reduction Ratio | Gear Step |
|---|---|---|
| 1st Speed | 4.894 |  |
|  |  | 1.537 |
| 2nd Speed | 3.184 |  |
|  |  | 1.511 |
| 3rd Speed | 2.107 |  |
|  |  | 1.255 |
| 4th Speed | 1.679 |  |
|  |  | 1.301 |
| 5th Speed | 1.291 |  |
|  |  | 1.291 |
| 6th Speed | 1.000 |  |
|  |  | 1.203 |
| 7th Speed | 0.831 |  |
|  |  | 1.276 |
| 8th Speed | 0.651 |  |
| Reverse Speed | -3.530 |  |

FIG. 3

| | Reduction Ratio | Gear Step |
|---|---|---|
| 1st Speed | 4.894 | |
| | | 1.572 |
| 2nd Speed | 3.114 | |
| | | 1.478 |
| 3rd Speed | 2.107 | |
| | | 1.234 |
| 4th Speed | 1.707 | |
| | | 1.309 |
| 5th Speed | 1.304 | |
| | | 1.304 |
| 6th Speed | 1.000 | |
| | | 1.215 |
| 7th Speed | 0.823 | |
| | | 1.294 |
| 8th Speed | 0.636 | |
| Reverse Speed | −3.462 | |

AUTOMATIC TRANSMISSION

CROSS REFERENCE TO RELATED APPLICATIONS

This application claims priority to Japanese Patent Application Nos. 2014-213055 and 2014-213057, each filed on Oct. 17, 2014, the entire disclosure of each of which is herein incorporated by reference in its entirety for all purposes.

FIELD OF THE INVENTION

The present invention relates to an automatic transmission mounted on a vehicle and belongs to the technical field of transmissions for vehicles.

BACKGROUND ART

An automatic transmission mounted on a vehicle generally includes a plurality of planetary gear sets (planetary gear mechanisms) and a plurality of hydraulic pressure type frictional engagement elements such as clutches or brakes and is configured so that it switches a power transmission path going through each planetary gear set by selectively engaging these frictional engagement elements by hydraulic control and actualizes a plurality of forward gear shift stages and usually one stage of reverse gear shift. However, in recent years, it has become more desirable to provide multiple stages for the forward gear shift stage to improve engine fuel efficiency or shift performance. For example, one automatic transmission that has been considered includes three planetary gear sets and six frictional engagement elements and actualizes eight forward stages by engaging two of these frictional engagement elements.

However, according to this configuration, four frictional engagement elements in an unengaged state exist at each gear shift stage. As a result, the loss of driving force of the transmission as a whole is increased due to the sliding resistance among the friction plates of these frictional engagement elements or viscosity resistance of lubricant among the friction plates, possibly negating the improvements in fuel efficiency that are achieved by providing multiple stages for the forward gear shift stage.

On the other hand, Patent Document 1 discloses an automatic transmission that includes four planetary gear sets and five frictional engagement elements and actualizes forward eight stages by selectively engaging three of these frictional engagement elements. According to this Document, the number of the frictional engagement elements in the unengaged state at each gear shift stage becomes two, thereby suppressing losses in driving force as described above.

RELATED ART

Patent Document

Patent Document 1
Japanese Unexamined Patent Application Publication No. 4644700

SUMMARY OF THE INVENTION

Problems to be Solved by the Invention

The automatic transmission disclosed in Patent Document 1, as shown in FIG. 8, is configured so that it arranges a first, a second, a third, and a fourth planetary gear sets PGa, PGb, PGc, and PGd from an input side (the left side of the figure), arranges a first clutch CLa between the second and the third planetary gear sets PGb and PGc, arranges a second clutch CLb and a third clutch CLc on an outer circumferential side and an inner circumferential side between the third and the fourth planetary gear sets PGc and PGd respectively, and also connects a carrier of the first planetary gear set PGa with a ring gear of the fourth planetary gear set PGd by a power transmission member x, connects a ring gear of the second planetary gear set PGb with a sun gear of the third planetary gear set PGc by a power transmission member y, and connects a carrier of the third planetary gear set PGc with a carrier of the fourth planetary gear set PGd by a power transmission member z.

According to this configuration, the power transmission members x and y cover the outside of the first clutch CLa, the power transmission members x and z cover the outside of the second and the third clutches CLb and CLc, and these clutches CLa, CLb, and CLc are located in the closed space bounded by the planetary gear sets on both sides and the power transmission members on the outside.

Therefore, when a hydraulic pressure supply passage becomes long and complicated and the transmission is enlarged, it causes the deterioration of the responsiveness of the shift control to hydraulic pressure.

The present invention deals with the above problems associated with providing multiple stage in automatic transmission and actualizes an automatic transmission having a new configuration that can simplify the hydraulic pressure supply passage to the clutches.

BRIEF SUMMARY OF THE INVENTION

In order to solve the above problems, the automatic transmission according to the present invention is configured as follows.

First, according to the present invention according to the claim 1, in a transmission case, coaxially, an automatic transmission comprising: an input part; an output part; a first planetary gear set including a first sun gear, a first carrier, and a first ring gear; a second planetary gear set including a second sun gear, a second carrier, and a second ring gear; a third planetary gear set including a third sun gear, a third carrier, and a third ring gear; a fourth planetary gear set including a fourth sun gear, a fourth carrier, and a fourth ring gear; a first, a second, and a third clutches, and a first and a second brakes, wherein the first sun gear and the second sun gear are constantly connected, the first ring gear and the fourth carrier are constantly connected, the first brake decouples between the first sun gear, the second sun gear, and the transmission case, the second brake decouples between the fourth ring gear and the transmission case, the second brake decouples between the fourth ring gear and the transmission case, and the first planetary gear set and the fourth planetary gear set are configured as a single pinion type. When the second planetary gear set is configured as a double pinion type and the third planetary gear set is configured as a single pinion type, the first carrier and the third carrier are constantly connected, the second carrier and the third sun gear are constantly connected, the input part is constantly connected to the second ring gear, the output part is constantly connected to the first carrier and the third carrier, the first clutch decouples between the third ring gear and the fourth sun gear, the second clutch decouples between the second carrier, the third sun gear, and the fourth sun gear, the third clutch decouples between the input part, the second ring gear, and the fourth sun gear. Moreover, when the second planetary gear set is configured as a single pinion type and the third planetary gear set is configured as a double pinion type, the first carrier and the third ring gear are constantly connected, the second ring gear and the third sun gear are constantly connected, the input part is constantly connected to the second carrier, the output part is constantly connected to the first carrier and the third ring gear, the first clutch decouples between the third carrier and the fourth sun gear, the second clutch decouples between the second ring gear, the third sun gear, and the fourth sun gear, and the third clutch decouples between the input part, the second carrier, and the fourth sun gear.

Moreover, according to the invention of the claim 2 as described in the invention of the claim 1, wherein among the first, the second, and the third clutches, and the first and the second brakes, when the third clutch, the first brake, and the second brake are engaged, a first gear speed is formed; when the second clutch, the first brake, and the second brake are engaged, a second gear speed is formed; when the second clutch, the third clutch, and the second brake are engaged, a third gear speed is formed; when the first clutch, the second clutch, and the second brake are engaged, a fourth gear speed is formed; when the first clutch, the third clutch, and the second brake are engaged, a fifth gear speed is formed; when the first clutch, the second clutch, and the third clutch are engaged, a sixth gear speed is formed; when the first clutch, the third clutch, and the first brake are engaged, a seventh gear speed is formed; when the first clutch, the second clutch, and the first brake are engaged, an eighth gear speed is formed; and when the first clutch, the first brake, and the second brake are engaged, a reverse gear speed is formed.

Furthermore, according to the invention of the claim 3 as described in the inventions in claim 1 or claim 2, among the first, second, third, and fourth planetary gear sets, the fourth planetary gear set is arranged on one endmost side in the axial direction, and the first, second, and third clutches are arranged to be closer to one end side in the axial direction than the fourth planetary gear set.

Advantageous Effects of the Invention

According to the invention of the claim 1, the one side of the members decoupled by the first, the second, and the third clutches are all the fourth sun gear, the other side of the first clutch is the third ring gear, the other side of the second clutch is the second carrier and the third sun gear, the other side of the third clutch is the input part and the second ring gear, so that the common power transmission member connecting these three clutches to the fourth sun gear can be arranged in the unclosed state that is not bounded by other power transmission members or planetary gear sets in the transmission case. Therefore, by only going through the common power transmission members from the transmission case, the hydraulic pressure can be supplied to the first, the second, and the third clutches.

Accordingly, for example, as the conventional automatic transmission shown in FIG. 8, compared to the case in which the clutch is arranged in the closed space bounded by the planetary gear sets or the power transmission members, a short and simple hydraulic pressure supply passage to the first, the second, and the third clutches can be configured. Therefore, while achieving multiple stages by configuring the automatic transmission with four planetary gear sets, two brakes, and three clutches, deterioration of the responsiveness of shift control due to, for example, the enlargement of the transmission or the application and release of hydraulic pressure is inhibited.

According to the invention of the claim 2, the shift control of the automatic transmission related to the present invention is embodied as described above, so that while the enlargement as a whole of the transmission and the deterioration of the responsiveness of the shift control are controlled, an automatic transmission having the eight forward stages and the one reverse stage is actualized.

According to the invention of the claim 3, since the first, the second, and the third clutches are arranged to be closer to one end side of the axial direction than any of the planetary gear sets, arrangement of these three clutches in the unclosed state can be easily actualized. Moreover, since all three clutches are connected to a rotating element of the fourth planetary gear set in proximity to the axial direction, shortening the common power transmission members for this connection is achieved. Accordingly, while interference between the common power transmission members and other power transmission members is easily avoided, the compactification of the automatic transmission can be achieved.

BRIEF DESCRIPTION OF THE DRAWINGS

FIG. 2 is an engagement table of frictional engagement elements of the same automatic transmission.

FIG. 3 is a table showing reduction ratios and gear steps of each gear shift stage in the first embodiment of the present invention.

DETAILED DESCRIPTION OF THE EMBODIMENTS

Hereinafter, embodiments according to the present invention are described.

First Embodiment

Figure 1:
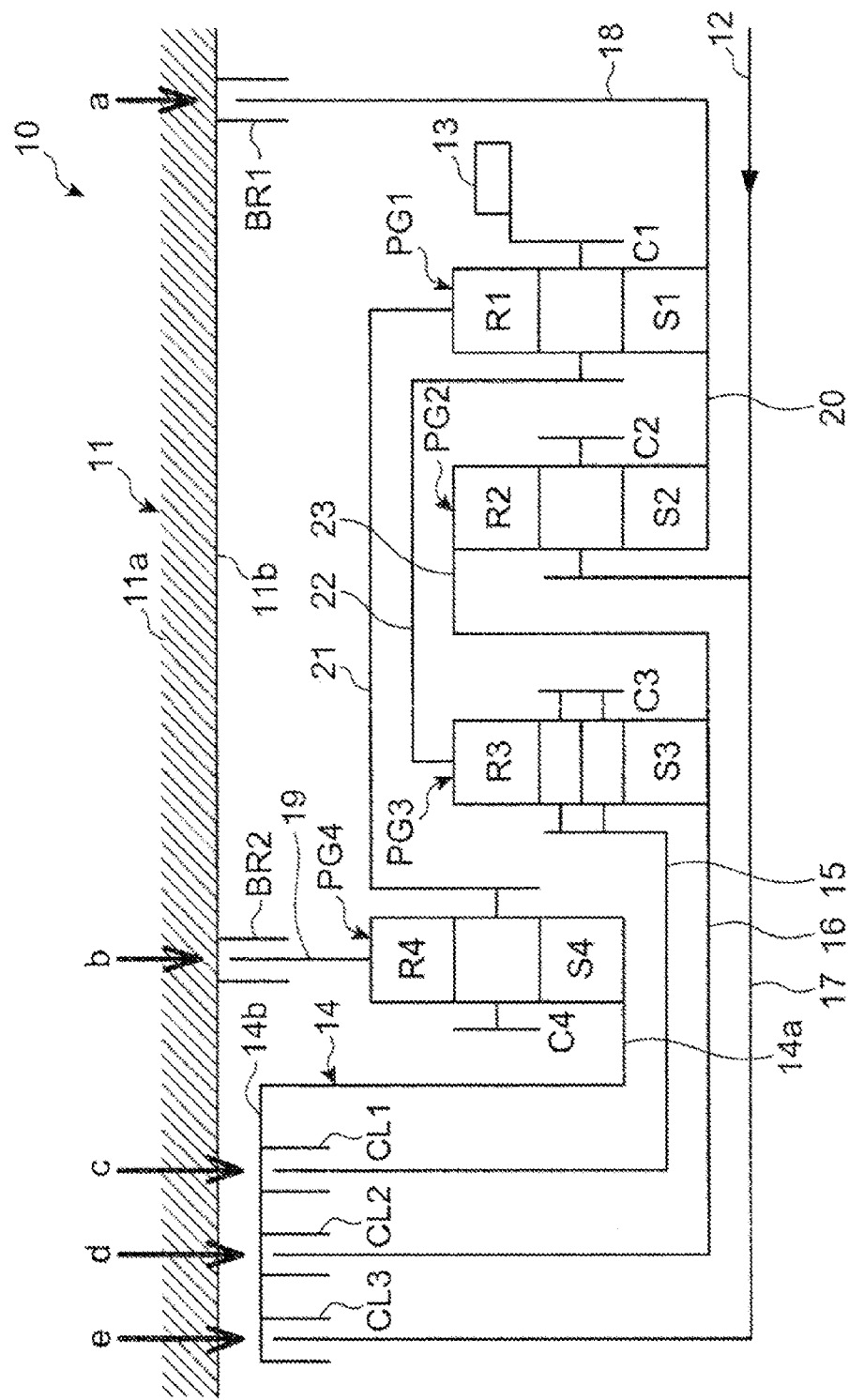
FIG. 1 is a schematic diagram of an automatic transmission related to the first embodiment of the present invention.

FIG. 1 is a schematic diagram showing the configuration of an automatic transmission 10 related to a first embodiment of the present invention, and the automatic transmission 10 is a transversely mounted type automatic transmission having an input shaft 12 as an input part extending from a driving source side (right side of the figure) and an output gear 13 as an output part in a transmission case 11. The output gear 13 is arranged on the same coaxial line as the input shaft 12.

An end part of the input shaft 12 in the right side of the figure is connected to an arbitrary driving source (not shown). When using an engine as a driving source, a torque converter is provided between the input shaft 12 and the engine. The output gear 13 is connected to the axles (not shown) via a differential mechanism (not shown). Accordingly, the power of the driving source is transmitted to the bilateral axles with rotational differences adapted to current driving conditions after changing gears with the automatic transmission 10.

Moreover, although an example of arranging the driving source to the right side of the automatic transmission 10 is illustrated in FIG. 1, the driving source may be arranged to the left side of the figure, and in this case, the input shaft 12 is provided so as to extend from the left side of the figure. Furthermore, the driving sources may be arranged on both sides of the automatic transmission 10 respectively by connecting one driving source to one end side of the input shaft 12 and connecting the other driving source to the other end side of the input shaft 12, and a drive unit for hybrid vehicles that uses a plurality of driving sources selectively or in combination can be easily formed.

On the axis line of the input shaft 12, a first, second, third, and fourth planetary gear sets (hereinafter, simply call "gear sets") PG1, PG2, PG3, and PG4 are provided in this order from the driving source side.

Moreover, a first brake BR1 is provided on the driving source side of the output gear 13, and a second brake BR2 is provided in the vicinity of the fourth gear set PG4. Furthermore, a first, second, and third clutches CL1, CL2, and CL3 are provided on the reverse driving source side of the fourth gear set PG4. For example, the first, second, and third clutches CL1, CL2, and CL3 are provided in this order from the driving source side so as to be aligned in the axial direction.

The first to fourth gear sets PG1 to PG4 each have three rotating elements respectively. As these rotating elements, the first gear set PG1 has a first sun gear S1, a first ring gear R1, and a first carrier C1; the second gear set PG2 has a second sun gear S2, a second ring gear R2, and a second carrier C2; the third gear set PG3 has a third sun gear S3, a third ring gear R3, and a third carrier C3; and the fourth gear set PG4 has a fourth sun gear S4, a fourth ring gear R4, and a fourth carrier C4.

The first, the second, and the fourth gear sets PG1, PG2, and PG4 are a single pinion type, and on the single pinion type gear sets PG1, PG2, and PG4, the pinions supported by the carriers C1, C2, and C4 are directly engaged with the sun gears S1, S2, and S4 and the ring gears R1, R2, and R4.

On the other hand, the third gear set PG3 is a double pinion type and has the first pinion meshed with the third sun gear S3, and the second pinion meshed with the first pinion and the third ring gear R3, and these pinions are supported by the third carrier C3.

According to this automatic transmission 10, the first sun gear S1 and the second sun gear S2; the first carrier C1 and the third ring gear R3; the first ring gear R1 and the fourth carrier C4; and the second ring gear R2 and the third sun gear S3 are constantly connected, respectively. The input shaft 12 is constantly connected to the second carrier C2, and the output gear 13 is constantly connected to the first carrier C1 and the third ring gear R3, respectively.

The first brake BR1 is provided between the transmission case 11 and the first and the second sun gears S1 and S2 so as to decouple them, and the second brake BR2 is provided between the transmission case 11 and the fourth ring gear R4 so as to decouple them. The first and the second brakes BR1 and BR2 are unified with the transmission case 11 at an outer circumferential side of a friction plate, which is coupled or separated according to the application or release of the hydraulic pressure, and inside rotating members 18 and 19, which are provided on an inner circumferential side of the friction plate, are coupled to the first sun gear S1 and the fourth ring gear R4, respectively. The inside rotating members 18 of the first brake BR1 are directly coupled to the first sun gear S1, and are coupled to the second sun gear S2 via the first sun gear S1 and a power transmission member 20.

Since a hydraulic pressure chamber of the first and the second brakes BR1 and BR2 is provided on the transmission case 11, the hydraulic pressure is supplied directly from hydraulic pressure supply passages a and b, which are provided on the transmission case 11, to each hydraulic pressure chamber.

The first clutch CL1 is provided between the third carrier C3 and the fourth sun gear S4 so as to decouple them, the second clutch CL2 is provided between the second ring gear R2, the third sun gear S3, and the fourth sun gear S4 so as decouple them, and the third clutch CL3 is provided between the input shaft 12, the second carrier C2, and the fourth sun gear S4 so as to decouple them.

Since any pair of inner and outer rotating members, to which the friction plate is engaged and coupled, of any the first to third clutches CL1 to CL3 is coupled to the fourth sun gear S4, the outside rotating members, which are arranged to an outer circumferential side of the friction plate, are unified to be a drum shaped outside common rotating member 14, and an end part 14a of the driving source side thereof is coupled to the fourth sun gear S4.

An inside rotating member 15 of the first clutch CL1 is coupled to the third carrier C3, an inside rotating member 16 of the second clutch CL2 is coupled to the third sun gear S3, and an inside rotating member 17 of the third clutch CL3 is coupled to the input shaft 12.

According to the automatic transmission 10 configured as described above, by controlling the application and release of hydraulic pressure to the frictional engagement elements BR1, BR2, CL1, CL2, and CL3, as shown on the engagement table in FIG. 2, by selectively engaging three frictional engagement elements from five frictional engagement elements, one to eight forward gear speeds and a reverse gear speed are formed.

At this point, by properly setting the number of teeth of each gear of the first to fourth gear sets PG1 to PG4, reduction ratios of each gear shift stage and gear steps between adjacent gear shift stages (the reduction ratio of a lower gear divided by the reduction ratio of a higher gear) can be configured as shown in FIG. 3. Accordingly, the gear steps between each gear shift stage are substantially equal, and an automatic transmission, in which the sixth gear speed is a directly coupling stage having a reduction ratio of 1, can be provided.

According to the automatic transmission 10 of the first embodiment, the first to the third clutches CL1 to CL3 are arranged closer to the reverse driving source side in the axial direction than any other component of the automatic transmission 10: namely, the four gear sets PG1 to PG4, the first and the second brakes BR1 and BR2, the input shaft 12, and the output gear 13. Therefore, in the transmission case 11, the three clutches CL1 to CL3 can be easily arranged in the unclosed state that is not bounded by planetary gear sets or other power transmission members without interfering with the gear sets PG1 to PG4, power transmission members 20, 21, 22, and 23 that are connected between rotating elements of gear sets PG1 to PG4, inside rotating members 18 and 19 of the first and the second brakes BR1 and BR2, the input shaft 12, and the output gear 13.

Moreover, since the first to third clutches CL1 to CL3 are arranged adjacent to the reverse driving source side of the fourth gear set PG4 that is arranged closest to the reverse driving source side among four gear sets PG1 to PG4, it is possible to shorten the outside common rotating member 14 that connects the clutches CL1 to CL3, arranged adjacent to each other in this manner, with the fourth sun gear S4 of the fourth gear set PG4.

Furthermore, the inside rotating members 15, 16, and 17 of the first to third clutches CL1 to CL3 are arranged so as to pass through the inside of the radial direction of the fourth sun gear S4, to which the end part 14a of the driving source side of the outside common rotating member 14 is coupled. Accordingly, while avoiding interference with the fourth gear set PG4, the inside rotating members 15, 16, and 17 can be connected to the third carrier C3 (arranged closer to the driving source side than the fourth gear set PG4), the third sun gear S3, and the input shaft 12 respectively with a simple and compact handling.

With this handling of the inside rotating members 15, 16, and 17 and the outside common rotating member 14, while achieving simplification and miniaturization of the overall configuration of the automatic transmission 10, the first to third clutches CL1, CL2, and CL3 can be arranged in the transmission case 11 in the above described unclosed state.

Moreover, the outside common rotating member 14 is stored in the unclosed state without other power transmission members on the outside thereof, and an outer peripheral surface 14b is arranged so as to be provided directly opposite to the inner peripheral surface 11b of an outer peripheral wall 11a in the transmission case 11.

Additionally, by using the hydraulic pressure supply passages c, d, and e, which are configured by communicating the oil passage provided on an outer peripheral wall 11a of the transmission case 11 with the oil passage provided on the outside common rotating member 14 via an inner peripheral surface 11b of the former and the outer peripheral surface 14b of the latter, the two opposed surfaces facing each other, hydraulic pressure is supplied to each hydraulic pressure chamber of the first to the third clutches CL1 to CL3 provided on the inside of the outside common rotating member 14.

Moreover, although not illustrated, a communicating part of the oil passage at the opposed surface between the inner peripheral surface 11b and the outer peripheral surface 14b is sealed with a seal ring.

In this manner, the hydraulic pressure supply from the oil passage provided on the outer peripheral wall 11a in the transmission case 11 to each hydraulic pressure chamber of the first to the third clutches CL1 to CL3 is done through only the hydraulic pressure supply passages c, d, and e. Thus, for example, going through the oil passage provided on the power transmission members and the like, other than the clutch constituent members as shown in a conventional example in FIG. 8, may not be necessary. As a result, the hydraulic pressure supply passage is shortened and simplified, so that the enlargement of the automatic transmission 10 and the deterioration of the responsiveness of the shift control are controlled.

Moreover, regarding the hydraulic pressure supply passage to the first to the third clutches CL1 to CL3, by reducing the communicating part of the oil passage among the relatively rotating members as described above the leak amount of the hydraulic fluid from the communicating part is reduced, and also by this structure the enlargement of the automatic transmission 10 as a whole due to pump enlargement and the deterioration of the responsiveness of the shift control due to leaking may be controlled.

Second Embodiment

Figure 4:
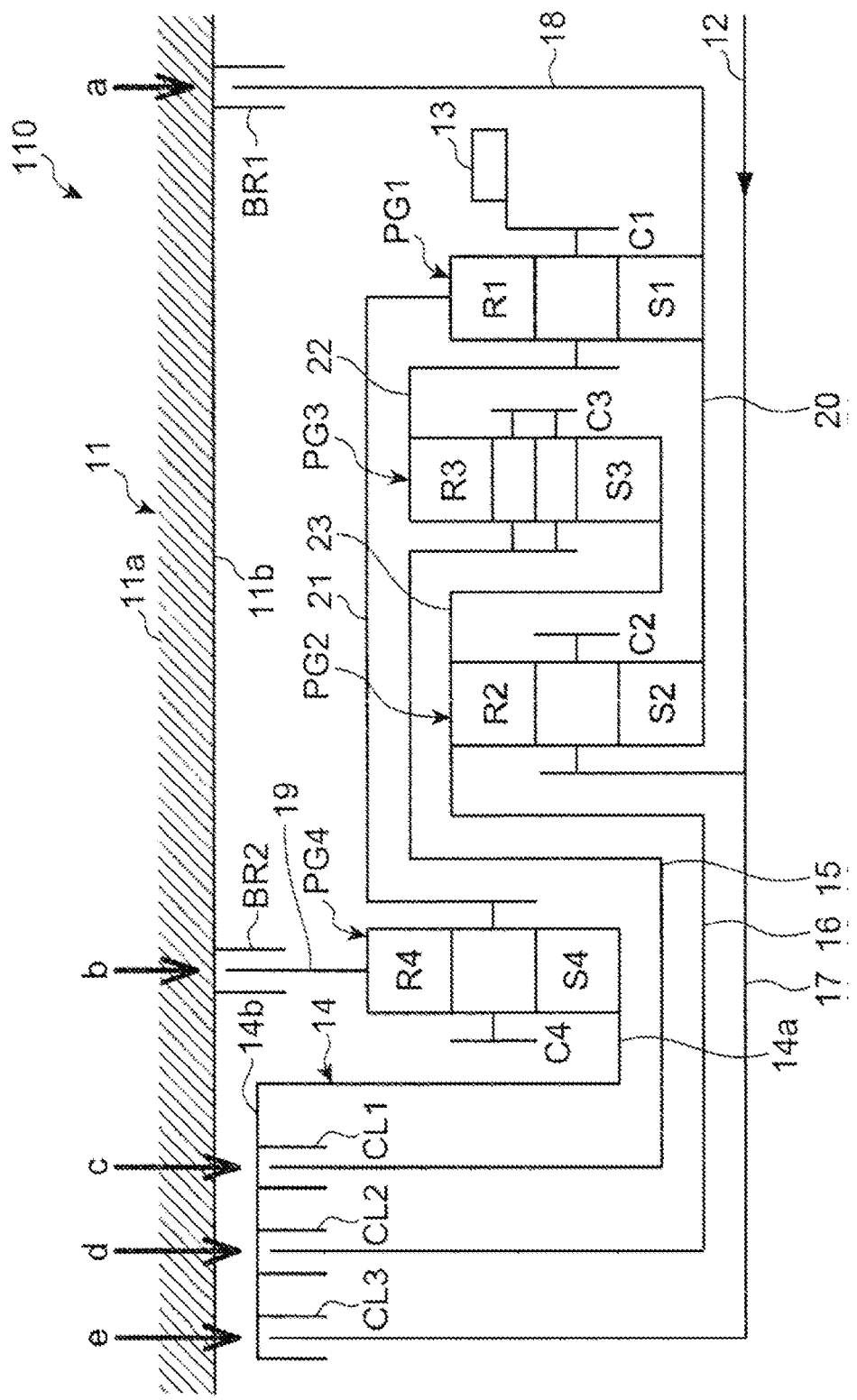
FIG. 4 is a schematic diagram of an automatic transmission according to the second embodiment of the present invention.

Next, an automatic transmission 110 according to the second embodiment shown in FIG. 4 is described. In addition, regarding the automatic transmission 110 of the second embodiment, while omitting explanations, the common configurations with the automatic transmission 10 of the first embodiment are indicated by the same numerical references in FIG. 4.

This automatic transmission 110 also arranges the output gear 13, the single pinion type first, second, and fourth gear sets PG1, PG2, and PG4, and the double pinion type third gear set PG3 on an axial center of the input shaft 12 extended from the driving source side (right side of the figure). It also includes the first to the third clutches CL1 to CL3 and the first and the second brakes BR1 and BR2 as frictional engagement elements, and is the same as the automatic transmission 10 according to the first embodiment regarding the coupling relationships of each rotating element and a decoupling relationships among the rotating elements with the frictional engagement elements or between the transmission case and the rotating elements.

Therefore, by the automatic transmission 110 according to the second embodiment, as shown by the engagement table in FIG. 2, the automatic transmission having eight forward stages and one reverse stage, where the sixth gear speed is a directly coupling stage having a reduction ratio of 1, can also be provided.

In the automatic transmission 110 according to the second embodiment, the first, third, second, and fourth gear sets PG1, PG3, PG2, and PG4 are arranged side by side in the axial direction in this order from the driving source side. In other words, compared to the first embodiment, the arrangement order of the second gear set PG2 and the third gear set PG3 is reversed.

Accordingly, the dimensions and shapes of the inside rotating members 15, 16, and 17 of the clutches CL1 to CL3 connecting to the rotating elements of the second and the third gear sets PG2 and PG3, power transmission members 20, 22, and 23, and the input shaft 12 are also different from those of the first embodiment.

Specifically, compared to the first embodiment, the input shaft 12 connecting to the second carrier C2 is extended to the reverse driving source side, although the shape of the power transmission members 23 connecting the second ring gear R2 with the third sun gear S3 is changed according to reversal of the axial direction position of these rotating elements, the dimensions are maintained, and the axial direction dimension of the power transmission members 22 connecting the first carrier C1 with the third ring gear R3 is shortened.

Moreover, compared to the first embodiment, the inside rotating members 15 of the first clutch CL1 connecting to the third carrier C3 are extended through the outside of the radial direction of the second gear set PG2 to the driving source side, the inside rotating members 16 of the second clutch CL2 are controlled to extend by directly connecting to the second ring gear R2 instead of the third sun gear S3, and the inside rotating members 17 of the third clutch CL3 connecting to the input shaft 12 are shortened. Like the first embodiment, by providing these inside rotating members 15, 16, and 17 so as to pass through the inside in the radial direction of the fourth sun gear S4, they are connected to the third carrier C3, the second ring gear R2, and the input shaft 12 respectively with a simple and compact handling.

Like the first embodiment, a single outside common rotating member 14 is used to connect the first to the third clutches CL1 to CL3 with the fourth sun gear S4, and the configuration of this outside common rotating member 14 is also the same as that of the first embodiment. Therefore, the outside common rotating member 14 is stored in the transmission case 11 in the unclosed state that has no other power transmission members on the outside thereof, and the outer peripheral surface 14b is arranged so as to be provided directly opposite to the inner peripheral surface 11b of the outer peripheral wall 11a in the transmission case 11. Accordingly, the hydraulic pressure supply passages c, d, and e, which communicate the oil passage provided on the outer peripheral wall 11a in the transmission case 11 with the oil passage provided on the outside common rotating member 14, are formed between the opposed surfaces 11b and 14b, which face each other.

Therefore, the hydraulic pressure supply from the oil passage provided on the outer peripheral wall 11a in the transmission case 11 to each hydraulic pressure chamber of the first to the third clutches CL1 to CL3 is performed only through the hydraulic pressure supply passages c, d, and e. Thus, for example, going through the oil passage provided on the power transmission members and the like, other than the clutch constituent members as shown in a conventional example in FIG. 8, may not be necessary. As a result, the hydraulic pressure supply passage is shortened and simplified, so that the enlargement of the automatic transmission 110 as a whole and the deterioration of the responsiveness of the shift control may be controlled.

Moreover, regarding the hydraulic pressure supply passage to the first to the third clutches CL1 to CL3, by reducing the communicating part of the oil passage among the relatively rotating members as described above, the leak amount of the hydraulic fluid from the communicating part is reduced, so that the enlargement of the automatic transmission 110 as a whole due to pump enlargement and the deterioration of the responsiveness of the shift control by leaking may be controlled.

Moreover, like the first embodiment, since the first to third clutches CL1 to CL3 are arranged closer to the reverse driving source side in the axial direction than any other component of the automatic transmission 110, these three clutches CL1 to CL3 can be easily arranged in the unclosed state as described above.

Furthermore, among the inside and outside rotating members of the first to the third clutches CL1 to CL3, while the outside common rotating member 14 is shortened by connecting to the fourth sun gear S4 of the fourth gear set PG4 adjacent to the clutches CL1 to CL3, since each of the inside rotating members 15, 16, and 17 is handled simply and compactly as described above, simplification and miniaturization of the overall configuration of the automatic transmission 110 can be achieved.

Third Embodiment

Figure 5:
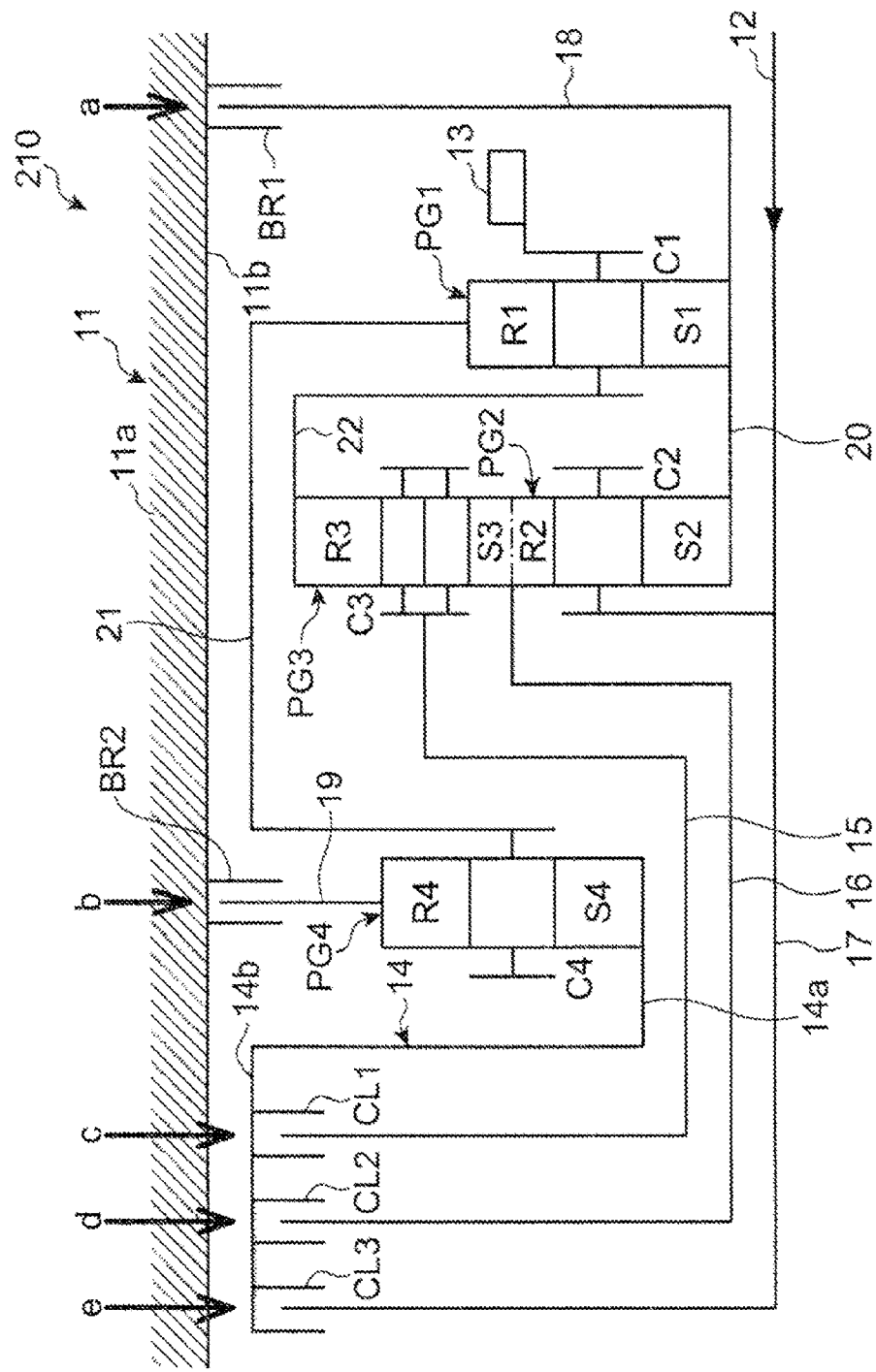
FIG. 5 is a schematic diagram of an automatic transmission according to the third embodiment of the present invention.

Next, an automatic transmission 210 according to the second embodiment shown in FIG. 5 is described. In addition, regarding the automatic transmission 210 of the third embodiment, while omitting explanations, the common configurations with the automatic transmission 10 of the first embodiment are indicated by the same numerical references in FIG. 5.

As well as this automatic transmission 210 also arranges the output gear 13, the single pinion type first, second, and fourth gear sets PG1, PG2, and PG4, and the double pinion type third gear set PG3 on an axial center of the input shaft 12 extended from the driving source side (right side of the figure), it includes the first to the third clutches CL1 to CL3 and the first and the second brakes BR1 and BR2 as frictional engagement elements, and is the same as the automatic transmission 10 according to the first embodiment regarding a connecting relationship of each rotating element and decoupling relationships among rotating elements by the frictional engagement elements or between the transmission case and the rotating elements.

Therefore, by the automatic transmission 210 according to the third embodiment, as shown by the engagement table in FIG. 2, the automatic transmission having eight forward stages and a one reverse stage, where the sixth gear speed is a directly coupling stage having a reduction ratio of 1, can also be provided.

In the automatic transmission 210 according to the third embodiment, the third gear set PG3 is arranged on the outside in the radial direction of the second gear set PG2, and the second ring gear R2 and the third sun gear S3 are unified. The first to fourth gear sets PG1 to PG4 are arranged side by side in the order of the first gear set PG1, the second and the third gear sets PG2 and PG3, and the fourth gear set PG4 from the driving source side.

According to the third embodiment, by arranging to overlap the second gear set PG and the third gear set PG3 in the axial direction, the axial direction distance between the first gear set PG1, which is the closest to the driving source side, and the fourth gear set PG4, which is the closest to the reverse driving source side, can be shortened, so that compactification of the automatic transmission 210 in the axial direction can be achieved.

In this manner, in the automatic transmission 210 according to the third embodiment, compared with the first embodiment, since the axial direction distance from the first gear set PG1 can be shortened by arranging the third and the fourth gear sets PG3 and PG4 closer to the driving source side, each axial direction dimension of a power transmission member 21 connecting the first ring gear R1 with the fourth carrier C4, and the power transmission members 22 connecting the first carrier C1 with the third ring gear R3 can be shortened. Moreover, by unifying the second ring gear R2 and the third sun gear S3, the power transmission member 23 (see FIG. 1) used to connect these rotating elements in the first embodiment can be omitted.

Furthermore, in the third embodiment, the first to the third clutches CL1 to CL3 as well as the third and the fourth gear sets PG3 and PG4 can also be arranged closer to the driving source side. Accordingly, the axial direction distance between the third clutch CL3, the second gear set PG2, and the input shaft 12 can be shortened, the axial direction dimension of the inside rotating member 17 of the third clutch CL3 connecting to the input shaft 12 can be shortened. Moreover, each axial direction dimension of the inside rotating members 15 and 16 of the first and the second clutches CL1 and CL2 and the input shaft 12 is maintained the same as the first embodiment.

In the third embodiment, like the first embodiment, a single outside common rotating member 14 is used to connect the first to the third clutches CL1 to CL3 with the fourth sun gear S4, and the configuration of this outside common rotating member 14 is also same as that of the first embodiment. Therefore, the outside common rotating member 14 is stored in the transmission case 11 in the unclosed state that has no other power transmission members on the outside thereof, and the outer peripheral surface 14b is arranged so as to be provided directly opposite to the inner peripheral surface 11b of the outer peripheral wall 11a in the transmission case 11. Accordingly, the hydraulic pressure supply passages c, d, and e, which communicate the oil passage provided on the outer peripheral wall 11a in the transmission case 11 with the oil passage provided on the outside common rotating member 14, are formed between the opposed surfaces 11b and 14b, which face each other.

Therefore, the hydraulic pressure supply from the oil passage provided on the outer peripheral wall 11a in the transmission case 11 to each hydraulic pressure chamber of the first to the third clutches CL1 to CL3 is performed through only the hydraulic pressure supply passages c, d, and e. Thus, for example, going through the oil passage provided on the power transmission members and the like, other than the clutch constituent members as a conventional example shown in FIG. 8, may not be necessary. As a result, the hydraulic pressure supply passage is shortened and simplified, so that the enlargement of the automatic transmission 210 as a whole and the deterioration of the responsiveness of the shift control may be controlled.

Moreover, regarding the hydraulic pressure supply passage to the first to the third clutches CL1 to CL3, by reducing the communicating part of the oil passage among the relatively rotating members as described above the leak amount of the hydraulic fluid from the communicating part is reduced, and also by this structure the enlargement of the automatic transmission 210 by pump enlargement or the deterioration of the responsiveness of the shift control by leaking may be controlled.

Moreover, like the first embodiment, since the first to third clutches CL1 to CL3 are arranged closer to the reverse driving source side in the axial direction than any other component of the automatic transmission 210, these three clutches CL1 to CL3 can be easily arranged in the unclosed state as described above.

Furthermore, among the inside and outside rotating members of the first to the third clutches CL1 to CL3, while the outside common rotating member 14 is shortened by connecting to the fourth sun gear S4 of the fourth gear set PG4 adjacent to the clutches CL1 to CL3, since each of the inside rotating members 15, 16, and 17 is handled simply and compactly via the inside in the radial direction of the fourth sun gear S4, simplification and miniaturization of the overall configuration of the automatic transmission 210 can be achieved.

Fourth Embodiment

Figure 6:
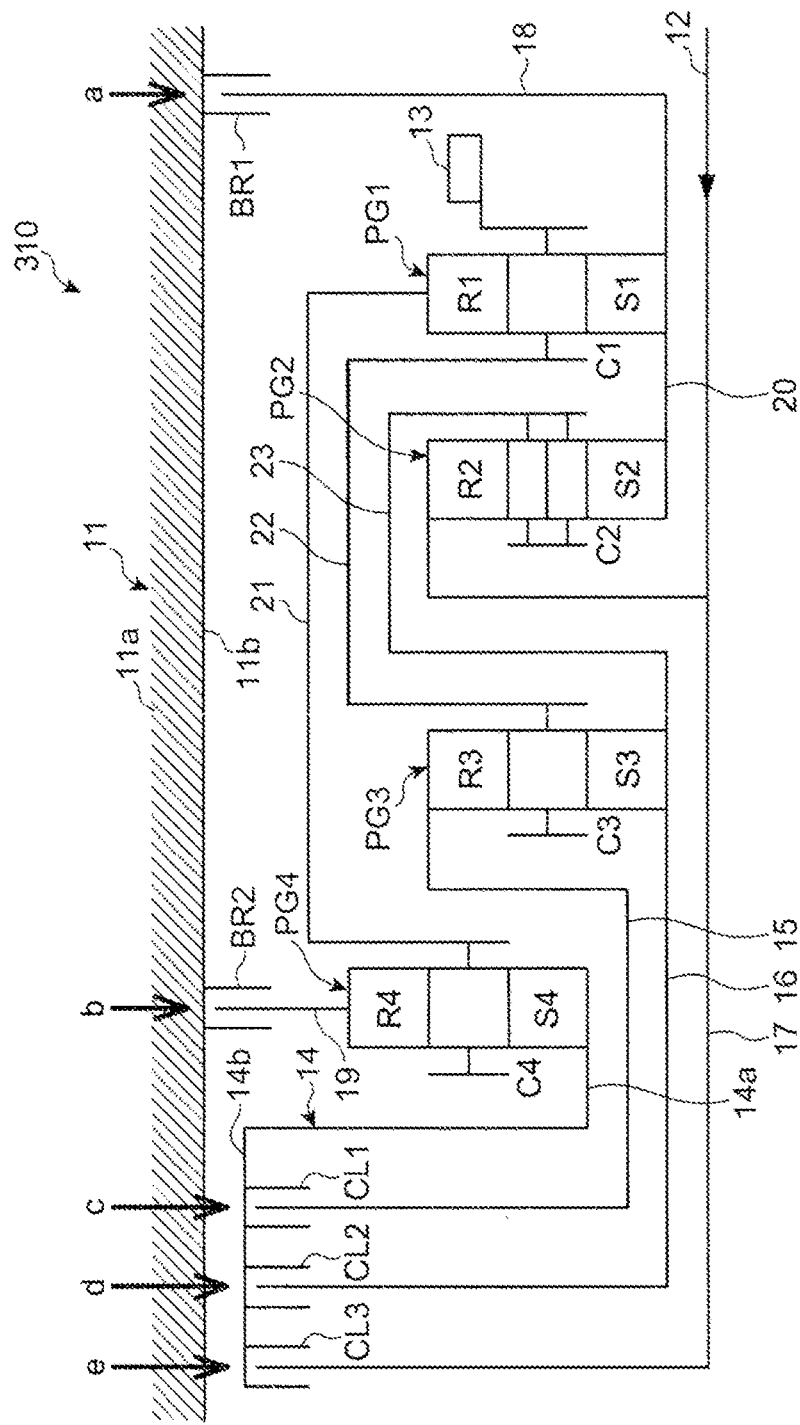
FIG. 6 is a schematic diagram of an automatic transmission related to the fourth embodiment of the present invention.

FIG. 6 is a schematic diagram showing the configuration of an automatic transmission 310 related to a fourth embodiment of the present invention, and the automatic transmission 310 is a transversely mounted type automatic transmission having an input shaft 12 as an input part extending from a driving source side (right side of the figure) and an output gear 13 as an output part in a transmission case 11. The output gear 13 is arranged on the same coaxial line as the input shaft 12.

An end part of the input shaft 12 in the right side of the figure is connected to an arbitrary driving source (not shown). When using an engine as a driving source, a torque converter is provided between the input shaft 12 and the engine. The output gear 13 is connected to the axles (not shown) via a differential mechanism (not shown). Accordingly, the power of the driving source is transmitted to the bilateral axles with rotational differences adapted to current driving conditions after changing gears with the automatic transmission 310.

Moreover, although an example of arranging the driving source to the right side of the automatic transmission 310 is illustrated in FIG. 6, the driving source may be arranged to the left side of the figure, and in this case, the input shaft 12 is provided so as to extend from the left side of the figure. Furthermore, the driving sources may be arranged on both sides of the automatic transmission 310 respectively, by connecting one driving source to one end side of the input shaft 12 and connecting the other driving source to the other end side of the input shaft 12, and a drive unit for hybrid vehicles that uses a plurality of driving sources selectively or in combination can be easily formed.

On the axis line of the input shaft 12, a first, second, third, and fourth planetary gear sets (hereinafter, simply call "gear sets") PG1, PG2, PG3, and PG4 are provided in this order from the driving source side.

Moreover, a first brake BR1 is provided on the driving source side of the output gear 13, and a second brake BR2 is provided in the vicinity of the fourth gear set PG4. Furthermore, a first, second, and third clutches CL1, CL2, and CL3 are provided on the reverse driving source side of the fourth gear set PG4. For example, the first, second, and third clutches CL1, CL2, and CL3 are provided in this order from the driving source side so as to be aligned in the axial direction.

The first to fourth gear sets PG1 to PG4 each have three rotating elements respectively. As these rotating elements, the first gear set PG1 has a first sun gear S1, a first ring gear R1, and a first carrier C1; the second gear set PG2 has a second sun gear S2, a second ring gear R2, and a second carrier C2; the third gear set PG3 has a third sun gear S3, a third ring gear R3, and a third carrier C3; and the fourth gear set PG4 has a fourth sun gear S4, a fourth ring gear R4, and a fourth carrier C4.

The first, the third, and the fourth gear sets PG1, PG3, and PG4 are a single pinion type, and on the single pinion type gear set PG1, PG3, and PG4, the pinions supported by the carriers C1, C3, and C4 are directly engaged with the sun gears S1, S3, and S4 and the ring gears R1, R3, and R4.

On the other hand, the second gear set PG2 is a double pinion type and has the first pinion meshed with the second sun gear S2, and the second pinion meshed with the first pinion and the second ring gear R2, and these pinions are supported by the second carrier C2.

Accordingly automatic transmission 310, the first sun gear S1 and the second sun gear S2; the first carrier C1 and the third carrier C3; the first ring gear R1 and the fourth carrier C4; and the second carrier C2 and the third sun gear S3 are constantly connected, respectively. The input shaft 12 is constantly connected to the second ring gear R2, and the output gear 13 is constantly connected to the first carrier C1 and the third carrier C3, respectively.

The first brake BR1 is provided between the transmission case 11 and the first and the second sun gears S1 and S2 so as to decouple them, and the second brake BR2 is provided between the transmission case 11 and the fourth ring gear R4 so as to decouple them. The first and the second brakes BR1 and BR2 are unified with the transmission case 11 at an outer circumferential side of a friction plate, which is coupled or separated according to the application and release of the hydraulic pressure, and inside rotating members 18 and 19, which are provided on an inner circumferential side of the friction plate, are coupled to the first sun gear S1 and the fourth ring gear R4, respectively. The inside rotating members 18 of the first brake BR1 are directly coupled to the first sun gear S1, and are coupled to the second sun gear S2 via the first sun gear S1 and a power transmission member 20.

Since a hydraulic pressure chamber of the first and the second brakes BR1 and BR2 is provided on the transmission case 11, the hydraulic pressure is supplied directly from hydraulic pressure supply passages a and b, which are provided on the transmission case 11, to each hydraulic pressure chamber.

The first clutch CL1 is provided between the third ring gear R3 and the fourth sun gear S4 so as to decouple them, the second clutch CL2 is provided between the second carrier C2, the third sun gear S3, and the fourth sun gear S4 so as decouple them, and the third clutch CL3 is provided between the input shaft 12, the second ring gear R2, and the fourth sun gear S4 so as to decouple them.

Since any pair of inner and outer rotating members, to which the friction plate is engaged and coupled, of any the first to third clutches CL1 to CL3, is coupled to the fourth sun gear S4, the outside rotating members, which are arranged to an outer circumferential side of the friction plate, are unified to be a drum shaped outside common rotating member 14, and an end part 14a of the driving source side thereof is coupled to the fourth sun gear S4.

An inside rotating member 15 of the first clutch CL1 is coupled to the third ring gear R3, an inside rotating member 16 of the second clutch CL2 is coupled to the third sun gear S3, and an inside rotating member 17 of the third clutch CL3 is coupled to the input shaft 12.

According to the automatic transmission 310 configured as described above, by controlling the application and release of hydraulic pressure to the frictional engagement elements BR1, BR2, CL1, CL2, and CL3, as shown on the engagement table in FIG. 2, by selectively engaging three frictional engagement elements from five frictional engagement elements, one to eight forward gear speeds and a reverse gear speed are formed.

Figures 7, 8:
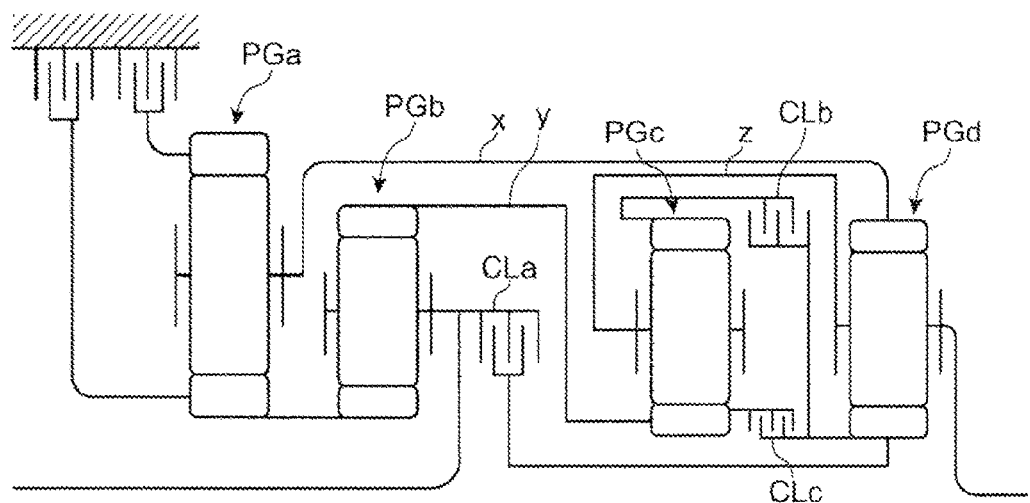
FIG. 7 is a table showing reduction ratios and gear steps of each gear shift stage in the fourth embodiment of the present invention.
FIG. 8 is a schematic diagram showing a conventional example of the automatic transmission having forward eight stages.

At this point, by properly setting the number of teeth of each gear of the first to fourth gear sets PG1 to PG4, reduction ratios of each gear shift stage and gear steps between adjacent gear shift stages (the reduction ratio of a lower gear divided by the reduction ratio of a higher gear) can be configured as shown in FIG. 7. Accordingly, the gear steps between each gear shift stage are substantially equal, and an automatic transmission, where the sixth gear speed is a directly coupling stage having a reduction ratio of 1, can be provided.

According to the automatic transmission 310 of the fourth embodiment, the first to the third clutches CL1 to CL3 are arranged closer to the reverse driving source side in the axial direction than any other components of the automatic transmission 310: namely, the four gear sets PG1 to PG4, the first and the second brakes BR1 and BR2, the input shaft 12, and the output gear 13. Therefore, in the transmission case 11, the three clutches CL1 to CL3 can be easily arranged in the unclosed state that is not bounded by planetary gear sets or other power transmission members without interfering with the gear sets PG1 to PG4, power transmission members 20, 21, 22, and 23 that are connected between rotating elements of gear sets PG1 to PG4, inside rotating members 18 and 19 of the first and the second brakes BR1 and BR2, the input shaft 12, and the output gear 13.

Moreover, since the first to third clutches CL1 to CL3 are arranged adjacent to the reverse driving source side of the fourth gear set PG4 that is arranged closest to the reverse driving source side among four gear sets PG1 to PG4, it is possible to shorten the outside common rotating member 14 that connects the clutches CL1 to CL3 arranged adjacent to each other in this manner with the fourth sun gear S4 of the fourth gear set PG4.

Furthermore, the inside rotating members 15, 16, and 17 of the first to third clutches CL1 to CL3 are arranged so as to pass through the inside of the radial direction of the fourth sun gear S4, to which the end part 14a of the driving source side of the outside common rotating member 14 is coupled. Accordingly, while avoiding interference with the fourth gear set PG4, the inside rotating members 15, 16, and 17 can be connected to the third carrier C3 (arranged closer to the driving source side than the fourth gear set PG4), the third sun gear S3, and the input shaft 12 respectively with a simple and compact handling.

With this handling of the inside rotating members 15, 16, and 17 and the outside common rotating member 14, while achieving simplification and miniaturization of the overall configuration of the automatic transmission 310, the first to third clutches CL1, CL2, and CL3 can be arranged in the transmission case 11 in the above described unclosed state.

Moreover, the outside common rotating member 14 is stored in the unclosed state without other power transmission members on the outside thereof, and an outer peripheral surface 14b is arranged so as to be provided directly opposite to the inner peripheral surface 11b of an outer peripheral wall 11a in the transmission case 11.

Additionally, by using the hydraulic pressure supply passages c, d, and e, which are configured by communicating the oil passage provided on an outer peripheral wall 11a of the transmission case 11 with the oil passage provided on the outside common rotating member 14 via an inner peripheral surface 11b of the former and the outer peripheral surface 14b of the latter, the two opposed surfaces facing each other, hydraulic pressure is supplied to each hydraulic pressure chamber of the first to the third clutches CL1 to CL3 provided on the inside of the outside common rotating member 14.

Moreover, although not illustrated, a communicating part of the oil passage at the opposed surface between the inner peripheral surface 11b and the outer peripheral surface 14b is sealed with a seal ring.

In this manner, the hydraulic pressure supply from the oil passage provided on the outer peripheral wall 11a in the transmission case 11 to each hydraulic pressure chamber of the first to the third clutches CL1 to CL3 is done through only the hydraulic pressure supply passages c, d, and e. Thus, for example, going through the oil passage provided on the power transmission members and the like, other than the clutch constituent members as shown in a conventional example in FIG. 8, may not be necessary. As a result, the hydraulic pressure supply passage is shortened and simplified, so that the enlargement of the automatic transmission 310 and the deterioration of the responsiveness of the shift control are controlled.

Moreover, regarding the hydraulic pressure supply passage to the first to the third clutches CL1 to CL3, by reducing the communicating part of the oil passage among the relatively rotating members as described above the leak amount of the hydraulic fluid from the communicating part is reduced, and also by this structure the enlargement of the automatic transmission 310 by pump enlargement and the deterioration of the responsiveness of the shift control by leaking may also be controlled.

As detailed above, although the present invention has been described with reference to the above embodiments, the present invention is not limited to the above described embodiments.

For example, according to the first to the fourth embodiments, although the first, the second, and the third clutches CL1, CL2, and CL3 are arranged in this order from the driving source side so as to be aligned in the axial direction, the arrangement of these clutches CL1 to CL3 is not limited to this way.

Specifically, for example, the clutches CL1, CL2, and CL3 may be provided so as to be aligned in the radial direction, in this case, for example, by arranging the first, the second, and the third clutches CL1, CL2, and CL3 in this order from the outside in the radial direction, the outside common rotating member 14 and the inside rotating members 15, 16, and 17 can be easily handled without interfering each other. Moreover, when arranging the clutches CL1 to CL3 in the radial direction in this manner, by providing a vertical wall extending from the outer peripheral wall 11a of the transmission case 11 to the inside in the radial direction, hydraulic pressure can be supplied to the hydraulic pressure chamber of each of the clutches CL1 to CL3 from the oil passage provided to the vertical wall as well as the above described embodiment, so that shortening and simplification the hydraulic pressure supply passage can be achieved.

Furthermore, the positional relationships of the first, the second, the third, the fourth gear sets PG1, PG2, PG3, and PG4 are not limited to the examples described in the above first to fourth embodiments. Among the four gear sets PG1, PG2, PG3, and PG4, as long as the fourth gear set PG4 has a rotating element, to which the first to the third clutches CL1, CL2, and CL3 are connected, which is arranged to one endmost side in the axial direction, the arrangements of the first to the third gear sets PG1, PG2, and PG3 can be arbitrarily changed.

INDUSTRIAL APPLICABILITY

In the above manner, according to the present invention, in the multistage automatic transmission having eight forward stages, for example, since its enlargement and the deterioration of the responsiveness of the shift control are controlled, it is possible to suitably apply this kind of automatic transmission to vehicles and the production technology fields of vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

EXPLANATION OF REFERENCE CHARACTERS 10, 110, 210, 310 Automatic transmissions
11 Transmission case
12 Input shaft
13 Output gear
14 Outside common rotating member
15, 16, 17 Inside rotating members
20 to 23 Power transmission members
PG1 to PG4 First to fourth planetary gear sets
S1 to S4 Sun gears
R1 to R4 Ring gears
C1 to C4 Carriers
CL1 to CL3 First to third clutches
BR1, BR2 First and Second brakes
a, b, c, d, Hydraulic pressure supply oil passages

We claim:

1. An automatic transmission, in a transmission case, comprising in a coaxial arrangement:
   an input part,
   an output part,
   a first planetary gear set including a first sun gear, a first carrier, and a first ring gear,
   a second planetary gear set including a second sun gear, a second carrier, and a second ring gear,
   a third planetary gear set including a third sun gear, a third carrier, and a third ring gear,
   a fourth planetary gear set including a fourth sun gear, a fourth carrier, and a fourth ring gear,
   a first, a second, and a third clutches, and
   a first and a second brakes:
   wherein the first sun gear and the second sun gear are constantly connected, the first ring gear and the fourth carrier are constantly connected, the first brake is operatively decoupled from the first sun gear, the second sun gear, and the transmission case, the second brake is operatively decoupled from the fourth ring gear and the transmission case, and the first planetary gear set and the fourth planetary gear set are configured as a single pinion type, and
   wherein the second planetary gear set is configured as a double pinion type and not as a single pinion type, the third planetary gear set is configured as a single pinion type and not as a double pinion type, the first carrier and the third carrier are constantly connected, the second carrier and the third sun gear are constantly connected, the input part is constantly connected to the second ring gear, the output part is constantly connected to the first carrier and the third carrier, the first clutch is operatively decoupled from the third ring gear and the fourth sun gear, the second clutch is operatively decoupled from the second carrier, the third sun gear, and the fourth sun gear, and the third clutch is operatively decoupled from the input part, the second ring gear, and the fourth sun gear.

2. The automatic transmission according to the claim 1, wherein
   among the first, second, and third clutches, and the first and the second brakes, a first gear speed is formed when the third clutch, the first brake, and the second brake are engaged, a second gear speed is formed when the second clutch, the first brake, and the second brake are engaged, a third gear speed is formed when the second clutch, the third clutch, and the second brake are engaged, a fourth gear speed is formed when the first clutch, the second clutch, and the second brake are engaged, a fifth gear speed is formed when the first clutch, the third clutch, and the second brake are engaged, a sixth gear speed is formed when the first clutch, the second clutch, and the third clutch are engaged, a seventh gear speed is formed when the first clutch, the third clutch, and the first brake are engaged, an eighth gear speed is formed when the first clutch, the second clutch, and the first brake are engaged, and a reverse gear speed is formed when the first clutch, the first brake, and the second brake are engaged.

3. The automatic transmission according to the claim 2, wherein
   the first, second, third, and fourth planetary gear sets are arranged along an axial direction of the transmission case of the automatic transmission, the axial direction comprising a proximal end and a distal end, such that the fourth planetary gear set is arranged at the distal end and the first, second, and third planetary gear sets are arranged at the proximal end; and the first, second, and third clutches are arranged at the distal end, such that the fourth planetary gear set is arranged more proximally in the axial direction than the first, second, and third clutches.

4. The automatic transmission according to the claim 1, wherein the first, second, third, and fourth planetary gear sets are arranged along an axial direction of the transmission case of the automatic transmission, the axial direction comprising a proximal end and a distal end, such that the fourth planetary gear set is arranged at the distal end and the first, second, and third planetary gear sets are arranged at the proximal end; and the first, second, and third clutches are arranged at the distal end, such that the fourth planetary gear set is arranged more proximally in the axial direction than the first, second, and third clutches.

5. An automatic transmission, in a transmission case, comprising, in a coaxial arrangement:

an input part, an output part, a single pinion type first planetary gear set including a first sun gear, a first carrier, and a first ring gear, a double pinion type second planetary gear set including a second sun gear, a second carrier, and a second ring gear, a single pinion type third planetary gear set including a third sun gear, a third carrier, and a third ring gear, a single pinion type fourth planetary gear set including a fourth sun gear, a fourth carrier, and a fourth ring gear, a first, a second, and a third clutches, and a first and a second brakes:

wherein the first sun gear and the second sun gear are constantly connected, the first carrier and the third carrier are constantly connected, the first ring gear and the fourth carrier are constantly connected, the second carrier and the third sun gear are constantly connected, the input part is constantly connected to the second ring gear, the output part is constantly connected to the first carrier and the third carrier, the first clutch is operatively decoupled from the third ring gear and the fourth sun gear, the second clutch is operatively decoupled from the second carrier, the third sun gear, and the fourth sun gear, the third clutch is operatively decoupled from the input part, the second ring gear, and the fourth sun gear, the first brake is operatively decoupled from the first sun gear, the second sun gear, and the transmission case, and the second brake is operatively decoupled from the fourth ring gear and the transmission case.

6. An automatic transmission, in a transmission case, comprising, in a coaxial arrangement:

an input part, an output part, a single pinion type first planetary gear set including a first sun gear, a first carrier, and a first ring gear, a single pinion type second planetary gear set including a second sun gear, a second carrier, and a second ring gear, a double pinion type third planetary gear set including a third sun gear, a third carrier, and a third ring gear, a single pinion type fourth planetary gear set including a fourth sun gear, a fourth carrier, and a fourth ring gear, a first, a second, and a third clutches, and a first and a second brakes:

wherein the first sun gear and the second sun gear are constantly connected, the first carrier and the third ring gear are constantly connected, the first ring gear and the fourth carrier are constantly connected, the second ring gear and the third sun gear are constantly connected, the input part is constantly connected to the second carrier, the output part is constantly connected to the first carrier and the third ring gear, the first clutch is operatively decoupled from the third carrier and the fourth sun gear, the second clutch is operatively decoupled from the second ring gear, the third sun gear, and the fourth sun gear, the third clutch is operatively decoupled from the input part, the second carrier, and the fourth sun gear, the first brake is operatively decoupled from the first sun gear, the second sun gear, and the transmission case, and the second brake is operatively decoupled from the fourth ring gear and the transmission case.

7. An automatic transmission, in a transmission case, comprising in a coaxial arrangement:

an input part, an output part, a first planetary gear set including a first sun gear, a first carrier, and a first ring gear, a second planetary gear set including a second sun gear, a second carrier, and a second ring gear, a third planetary gear set including a third sun gear, a third carrier, and a third ring gear, a fourth planetary gear set including a fourth sun gear, a fourth carrier, and a fourth ring gear, a first, a second, and a third clutches, and a first and a second brakes:

wherein the first sun gear and the second sun gear are constantly connected, the first ring gear and the fourth carrier are constantly connected, the first brake is operatively decoupled from the first sun gear, the second sun gear, and the transmission case, the second brake is operatively decoupled from the fourth ring gear and the transmission case, and the first planetary gear set and the fourth planetary gear set are configured as a single pinion type, and wherein the second planetary gear set is configured as a single pinion type and not as a double pinion type, the third planetary gear set is configured as a double pinion type and not as a single pinion type, the first carrier and the third ring gear are constantly connected, the second ring gear and the third sun gear are constantly connected, the input part is constantly connected to the second carrier, the output part is constantly connected to the first carrier and the third ring gear, the first clutch is operatively decoupled from the third carrier and the fourth sun gear, the second clutch is operatively decoupled from the second ring gear, the third sun gear, and the fourth sun gear, and the third clutch is operatively decoupled from the input part, the second carrier, and the fourth sun gear.

8. The automatic transmission according to claim 7, wherein among the first, second, and third clutches, and the first and the second brakes, a first gear speed is formed when the third clutch, the first brake, and the second brake are engaged, a second gear speed is formed when the second clutch, the first brake, and the second brake are engaged, a third gear speed is formed when the second clutch, the third clutch, and the second brake are engaged, a fourth gear speed is formed when the first clutch, the second clutch, and the second brake are engaged, a fifth gear speed is formed when the first clutch, the third clutch, and the second brake are engaged, a sixth gear speed is formed when the first clutch, the second clutch, and the third clutch are engaged, a seventh gear speed is formed when the first clutch, the third clutch, and the first brake are engaged, an eighth gear speed is formed when the first clutch, the second clutch, and the first brake are engaged, and a reverse gear speed is formed when the first clutch, the first brake, and the second brake are engaged.

9. The automatic transmission according to claim 8, wherein the first, second, third, and fourth planetary gear sets are arranged along an axial direction of the transmission case of the automatic transmission, the axial direction comprising a proximal end and a distal end, such that the fourth planetary gear set is arranged at the distal end and the first, second, and third planetary gear sets are arranged at the proximal end; and the first, second, and third clutches are arranged at the distal end, such that the fourth planetary gear set is arranged more proximally in the axial direction than the first, second, and third clutches.

10. The automatic transmission according to the claim 7, wherein the first, second, third, and fourth planetary gear sets are arranged along an axial direction of the transmission case of the automatic transmission, the axial direction comprising a proximal end and a distal end, such that the fourth planetary gear set is arranged at the distal end and the first, second, and third planetary gear sets are arranged at the proximal end; and the first, second, and third clutches are arranged at the distal end, such that the fourth planetary gear set is arranged more proximally in the axial direction than the first, second, and third clutches.

* * * * *